United States Patent
Kobayashi

(10) Patent No.: US 10,308,211 B2
(45) Date of Patent: Jun. 4, 2019

(54) SUPPORT STRUCTURE OF CLOSING MEMBER FOR GAS GENERATOR AND GAS GENERATOR USING SAME

(71) Applicant: DAICEL CORPORATION, Osaka-shi, Osaka (JP)

(72) Inventor: Tomoharu Kobayashi, Tatsuno (JP)

(73) Assignee: DAICEL CORPORATION, Osaka-Shi, Osaka (JP)

( * ) Notice: Subject to any disclaimer, the term of this patent is extended or adjusted under 35 U.S.C. 154(b) by 12 days.

(21) Appl. No.: 15/541,629

(22) PCT Filed: Jan. 6, 2016

(86) PCT No.: PCT/JP2016/050177
§ 371 (c)(1),
(2) Date: Jul. 5, 2017

(87) PCT Pub. No.: WO2016/121422
PCT Pub. Date: Aug. 4, 2016

(65) Prior Publication Data
US 2017/0341620 A1   Nov. 30, 2017

(30) Foreign Application Priority Data
Jan. 27, 2015 (JP) ................................. 2015-013400

(51) Int. Cl.
*B60R 21/26* (2011.01)
*B60R 21/272* (2006.01)
(Continued)

(52) U.S. Cl.
CPC ............... *B60R 21/272* (2013.01); *B01J 7/00* (2013.01); *B60R 21/274* (2013.01)

(58) Field of Classification Search
CPC . B60R 21/264; F16K 13/06; Y10T 137/1714; Y10T 137/1744
(Continued)

(56) References Cited

U.S. PATENT DOCUMENTS 5,992,881 A  * 11/1999  Faigle ................... B60R 21/264
                                                                    102/531
6,062,599 A     5/2000  Forbes et al.
(Continued)

FOREIGN PATENT DOCUMENTS

JP          2008-174215 A      7/2008
JP          2009-292238 A     12/2009

*Primary Examiner* — Toan C To
(74) *Attorney, Agent, or Firm* — Birch, Stewart, Kolasch & Birch, LLP

(57) ABSTRACT

A support structure of a closing member for a gas generator including a cylindrical housing accommodating an ignition device and an inflating gas source chamber is provided. The support structure includes a combination of a closing member closing a gas discharge path and a support member supporting the closing member and is arranged inside the cylindrical housing. The support member includes a base and a convex first support part extending in one direction from a center portion of the base, and a gas passage hole in at least one of the base and the convex first support part. The closing member, having a plate shape with first and second surfaces, is supported from one surface by a distal end surface of the convex first support part abutting against a center portion of the first or second surfaces, and has an annular surface not abutted by the convex first support part.

13 Claims, 8 Drawing Sheets

(a)

(b)

(51) Int. Cl.
*B01J 7/00* (2006.01)
*B60R 21/274* (2011.01)

(58) Field of Classification Search
USPC .................................. 280/737, 741; 102/531
See application file for complete search history.

(56) References Cited

U.S. PATENT DOCUMENTS

| | | | | |
|---|---|---|---|---|
| 6,116,642 | A * | 9/2000 | Shirk | B60R 21/264 |
| | | | | 280/736 |
| 6,176,249 | B1 * | 1/2001 | Al-Amin | B60R 21/268 |
| | | | | 137/68.13 |
| 6,206,414 | B1 * | 3/2001 | Cook | B60R 21/272 |
| | | | | 280/734 |
| 6,237,950 | B1 * | 5/2001 | Cook | B60R 21/264 |
| | | | | 102/531 |
| 6,273,462 | B1 * | 8/2001 | Faigle | B60R 21/264 |
| | | | | 280/737 |
| 6,332,404 | B1 * | 12/2001 | Rink | B60R 21/264 |
| | | | | 102/530 |
| 6,357,792 | B1 * | 3/2002 | Shirk | B60R 21/272 |
| | | | | 137/68.13 |
| 6,382,668 | B1 * | 5/2002 | Goetz | B60R 21/264 |
| | | | | 280/737 |
| 7,121,582 | B2 | 10/2006 | Campbell et al. | |
| 2008/0142127 | A1 | 6/2008 | Kitayama et al. | |
| 2013/0199399 | A1 * | 8/2013 | Young | F42B 3/04 |
| | | | | 102/530 |
| 2017/0008482 | A1 * | 1/2017 | Kobayashi | B60R 21/274 |
| 2017/0080894 | A1 * | 3/2017 | Kobayashi | B60R 21/272 |

* cited by examiner

[Fig. 1]
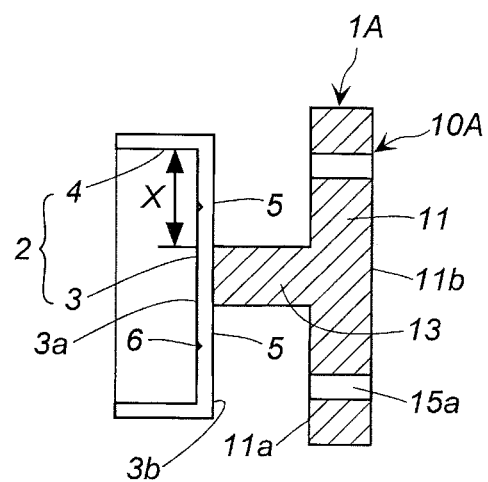
[Fig. 2]
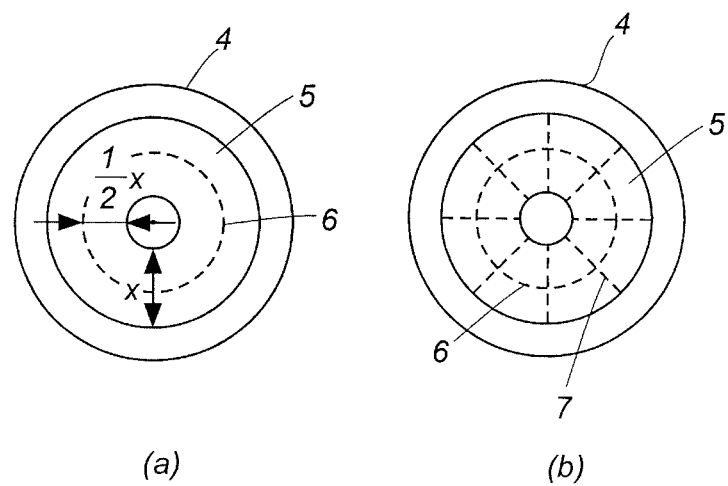
(a)　　　　　　(b)

[Fig. 3]
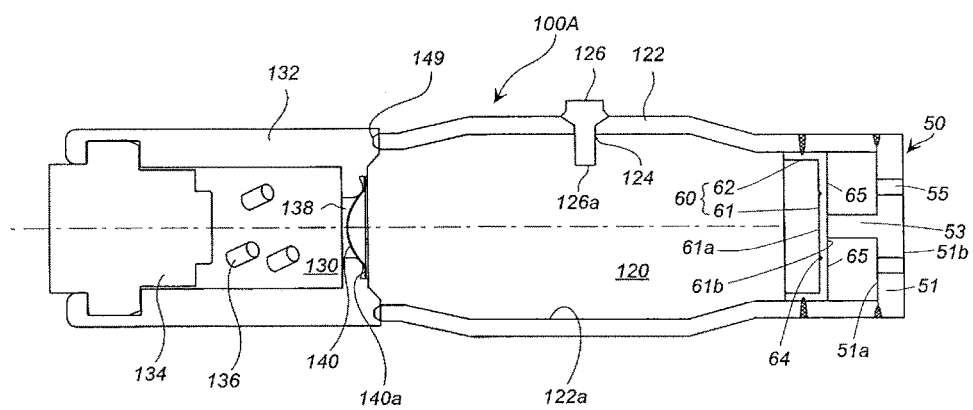

[Fig. 4]
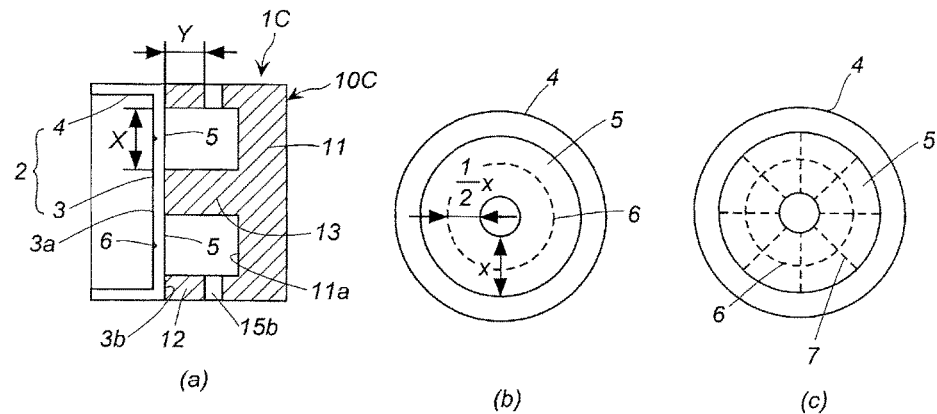
[Fig. 5]
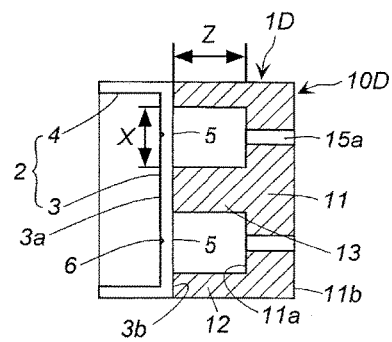
[Fig. 6]
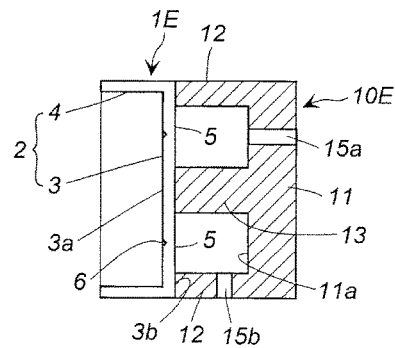

[Fig. 7]
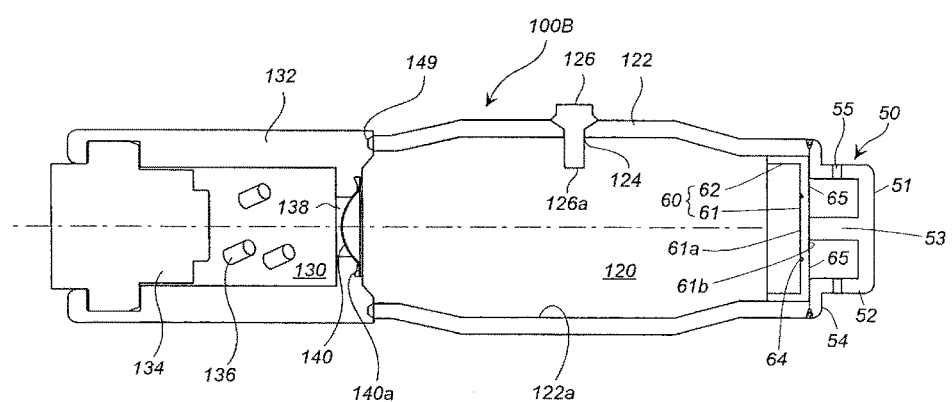

[Fig. 8]
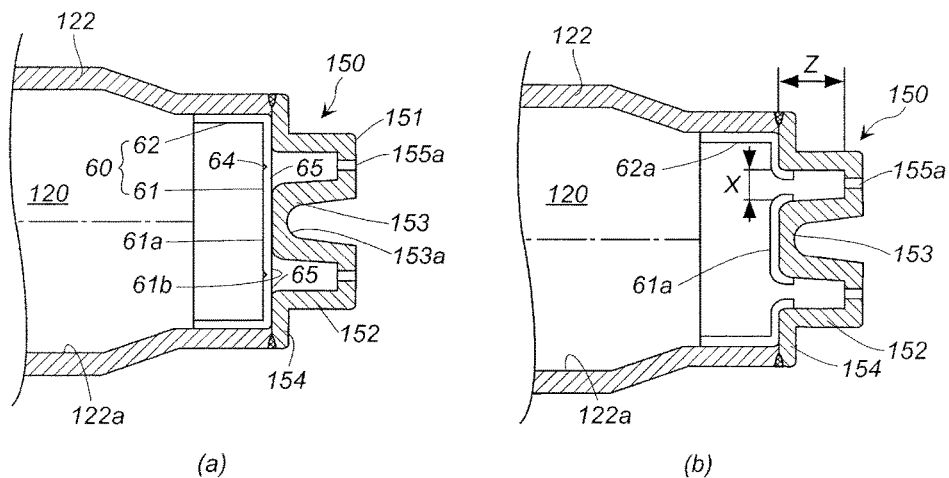
(a)  (b)
[Fig. 9]
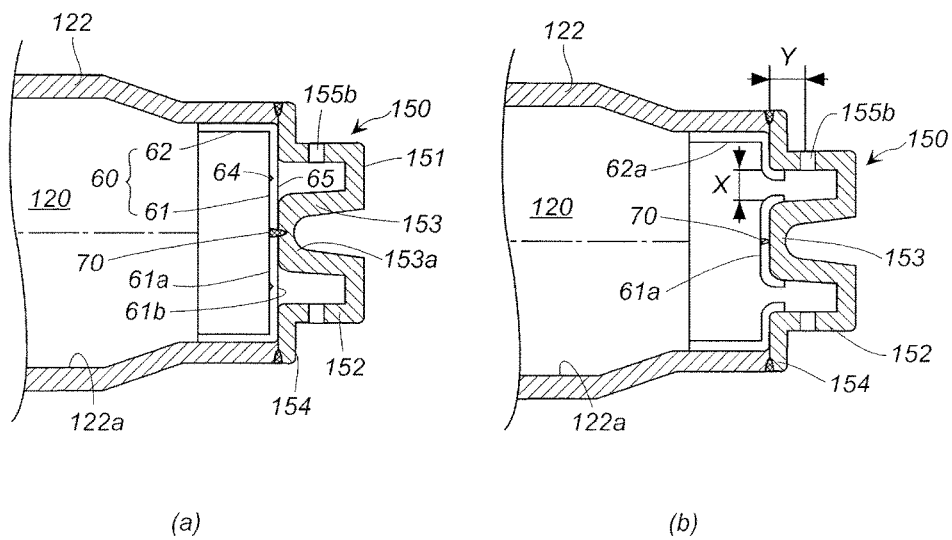
(a)  (b)

[Fig. 10]
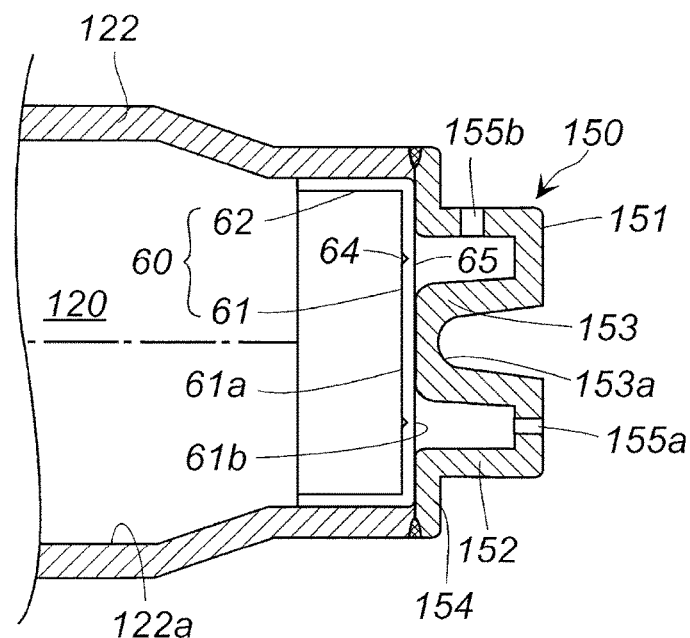
[Fig. 11]
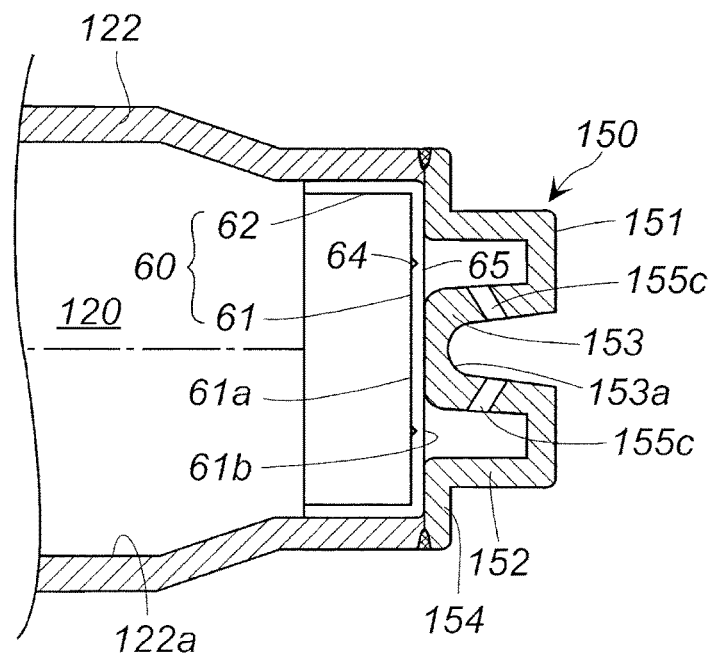

[Fig. 12]
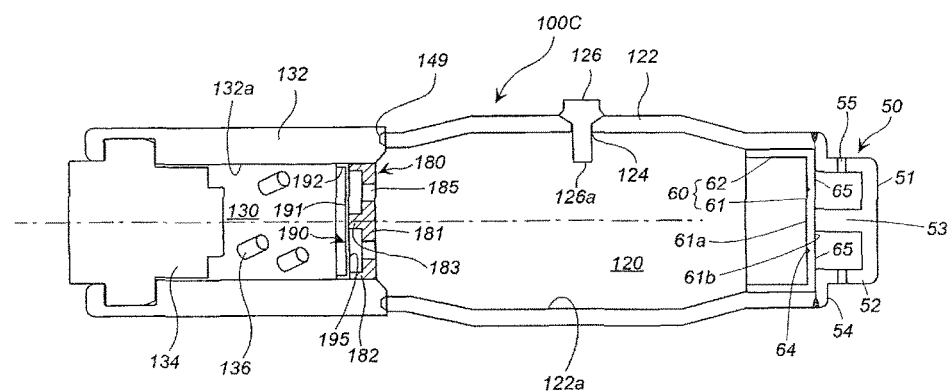
[Fig. 13]
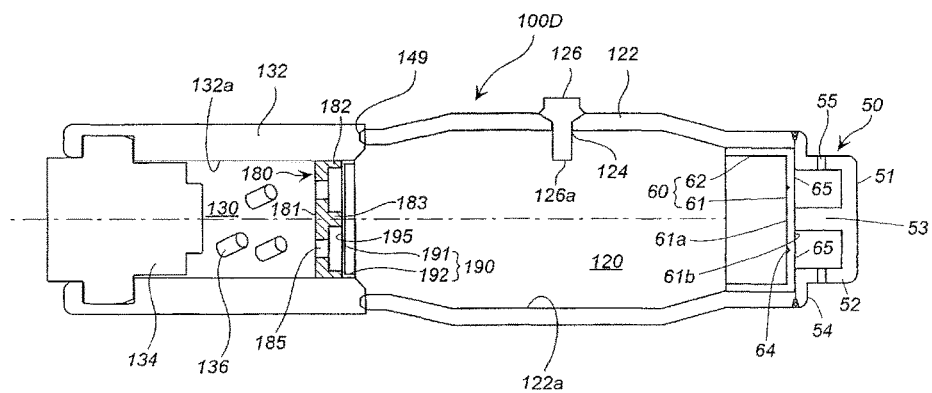

[Fig. 14]
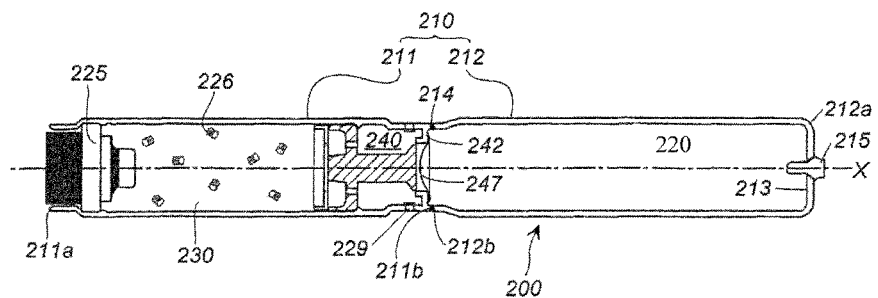
[Fig. 15]
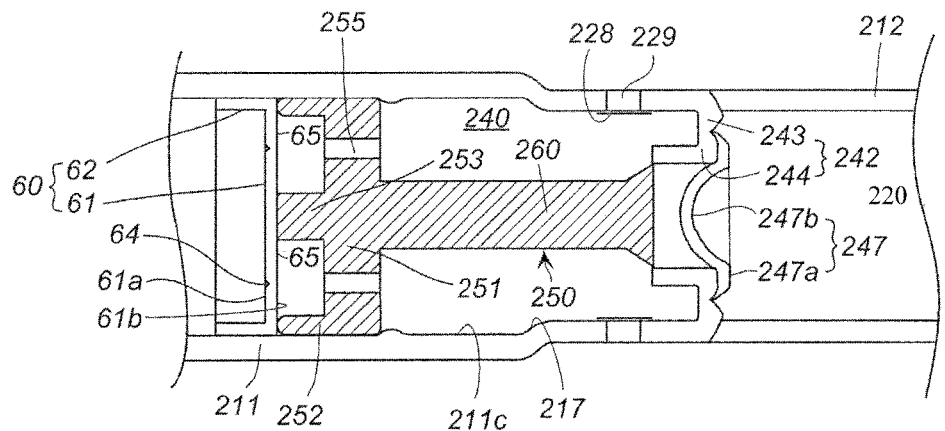

SUPPORT STRUCTURE OF CLOSING MEMBER FOR GAS GENERATOR AND GAS GENERATOR USING SAME

TECHNICAL FIELD

The present invention relates to a support structure of a closing member for a gas generator used in an airbag apparatus of an automobile or the like, and to a gas generator using the support structure.

DESCRIPTION OF RELATED ART

As a gas generator used in an airbag apparatus of an automobile or the like, a gas generator using a pressurized gas as an inflating gas source, a gas generator using a gas generating agent as an inflating gas source and a gas generator using a combination of a pressurized gas and a gas generating agent as an inflating gas source are used.

Some of the gas generators using a pressurized gas have such a structure that a closing member closes between an inflating gas source chamber (a pressurized gas chamber) filled with a pressurized gas and a gas discharge path leading to a gas discharge port and, upon actuation, the gas discharge path opens as the closing member is ruptured.

In an inflator 22 shown in FIG. 2 of U.S. Pat. No. 7,121,582, a chamber 50 inside a container 30 is filled with a pressurized gas, and a discharge port of the chamber 50 is closed by a rupture disk 92.

In the rupture disk 92, a circumferential portion is laser-welded (a laser-welded portion 94) to a surface 78 and a portion (a dome-shaped portion 122) including a central portion is supported by a support 100 (FIG. 3).

The inflator 22 opens the rupture disk 92 by operating as shown in FIGS. 5 to 7 after actuation from a state prior to the actuation shown in FIG. 3.

Due to the actuation of an initiator 98, a pressure is applied to the dome-shaped portion 122, which is a central portion of the rupture disk 92, from an opening 116 of the support 100 and thereby, as shown in FIG. 6, the dome-shaped portion 122 supported by the support 100 is separated and the rupture disk 92 is ruptured. As a result, the separated dome-shaped portion 122 remains in the form of fragments inside the inflator 22.

SUMMARY OF INVENTION

The present invention (hereinafter, referred to as a "first aspect") provides a support structure of a closing member for a gas generator, being arranged in the gas generator which includes a cylindrical housing provided with a gas discharge port, the cylindrical housing accommodating therein an ignition device and having an inflating gas source chamber filled with an inflating gas source, the support structure including:

a combination of the closing member for closing a gas discharge path and a support member of the closing member to be arranged inside the cylindrical housing, the support member including a base and a convex first support part which extends in one direction from a center portion of the base, and further including a gas passage hole in at least one of the base and the convex first support part, the closing member having a plate shape with a first surface and a second surface, the closing member being supported from one surface by a distal end surface of the convex first support part, which abuts against a center portion of the first surface or the second surface, and the closing member, which has an annular surface not abutted by the convex first support part, the closing member being opened as the annular surface of the closing member is ruptured.

The present invention (hereinafter, referred to as a "second aspect") provides a support structure of a closing member for a gas generator, being arranged in the gas generator which includes a cylindrical housing provided with a gas discharge port, the cylindrical housing accommodating therein an ignition device and having an inflating gas source chamber filled with an inflating gas source, the support structure including:

a combination of the closing member for closing a gas discharge path and a support member of the closing member to be arranged inside the cylindrical housing, the support member including a base, a convex first support part which extends in one direction from a center portion of the base, and an annular second support part which extends in a same direction as the first support part from a circumference of the base, and further including a gas passage hole in at least one of the base, the convex first support part and the annular second support part, the closing member having a plate shape with a first surface and a second surface, the closing member being supported from one surface by a distal end surface of the convex first support part which abuts against a center portion of the first surface or the second surface, and the annular second support part of the support member, which abuts against an outer circumferential edge portion on the side of the supported surface, and the closing member having an annular surface not abutted by the convex first support part and the annular second support part, the closing member being opened as the annular surface of the closing member is ruptured.

Further, the present invention provides a gas generator, including:

a cylindrical housing having a first end which is attached with an ignition device and a second end which is on an opposite side from the first end and is attached with a diffuser portion with a gas discharge port;

a combustion chamber being filled with a gas generating agent and arranged on the side of the ignition device, a pressurized gas chamber being filled with a pressurized gas as an inflating gas source and arranged on the side of the diffuser portion;

at least one of a gas discharge path between the diffuser portion and the pressurized gas chamber, and a gas discharge path between the combustion chamber and the pressurized gas chamber being closed by the support structure of a closing member according to the first aspect or the second aspect including the combination of the closing member and the support member, during actuation, the closing member being opened as the annular surface of the closing member is ruptured so that a gas is discharged from the gas passage hole.

BRIEF DESCRIPTION OF DRAWINGS

The present invention will become more fully understood from the detailed description given hereinbelow and the accompanying drawings which are given by way of illustration only, and thus are no limitative of the present invention and wherein:

FIG. 1 shows a cross-sectional view in an axial direction of a support structure of a closing member for a gas generator according to the present invention (the first aspect);

FIG. 2 shows, in (a), a plan view for explaining a formation position of a fragile portion in the closing member shown in FIG. 1 and, in (b), a plan view of an embodiment which differs from the embodiment shown in (a);

FIG. 3 shows a cross-sectional view in an axial direction of a gas generator using a support structure of a closing member for a gas generator according to the present invention (the first aspect);

FIG. 4 shows, in (a), a cross-sectional view in an axial direction of a support structure of a closing member for a gas generator according to the present invention (the second aspect), in (b), a plan view for explaining a formation position of a fragile portion in the closing member shown in (a) and, in (c), a plan view of an embodiment which differs from the embodiment shown in (b);

FIG. 5 shows a cross-sectional view in an axial direction of a support structure of a closing member for a gas generator according to the present invention (the second aspect) representing an embodiment which differs from the embodiment shown in (a) in FIG. 4;

FIG. 6 shows a cross-sectional view in an axial direction of a support structure of a closing member for a gas generator according to the present invention (the second aspect) representing an embodiment which differs from the embodiments shown in (a) in FIG. 4 and in FIG. 5;

FIG. 7 shows a cross-sectional view in an axial direction of a gas generator in which a support structure of a closing member for a gas generator according to the present invention (the second aspect) is used;

FIG. 8 shows a partial cross-sectional view in an axial direction of a gas generator representing an embodiment which differs from the gas generator shown in FIG. 7, in which (a) shows a state prior to actuation and (b) shows a state after actuation;

FIG. 9 shows a partial cross-sectional view in an axial direction of a gas generator representing an embodiment which yet differs from the gas generator shown in FIG. 7, in which (a) shows a state prior to actuation and (b) shows a state after actuation;

FIG. 10 shows a partial cross-sectional view in an axial direction of a gas generator representing an embodiment which yet differs from the gas generator shown in FIG. 7;

FIG. 11 shows a partial cross-sectional view in an axial direction of a gas generator representing an embodiment which yet differs from the gas generator shown in FIG. 7;

FIG. 12 shows a cross-sectional view in an axial direction of a gas generator representing another embodiment of the present invention;

FIG. 13 shows a cross-sectional view in an axial direction of a gas generator representing yet another embodiment of the present invention;

FIG. 14 shows a cross-sectional view in an axial direction of a gas generator representing yet another embodiment of the present invention; and FIG. 15 shows a partially enlarged view of FIG. 14.

DETAILED DESCRIPTION OF INVENTION

The present invention provides a support structure of a closing member for a gas generator in which a performance of gas discharge during actuation is not affected by a fragment of a rupturable plate (a closing member), and a gas generator in which the support structure is used.

A support structure of a closing member for a gas generator according to the first aspect is disposed in a gas discharge path inside a cylindrical housing, and the closing member closes the discharge path and a support member supports the closing member.

With the support structure of a closing member for a gas generator according to the first aspect, the closing member is supported by a convex support part formed on a first surface of a base of the support member, and the closing member further includes an annular surface not supported by the support part.

The convex first support part has a columnar distal end surface formed on the first surface of the base, and the distal end surface may be a flat surface, a concave surface, a curved surface, or the like. The convex first support part may be hollow but those with a cylindrical shape without a distal end surface are excluded.

The convex first support part may extend from the first surface of the base or may be a concave portion formed from a second surface to the first surface of the base (in other words, a cup-like convex portion which protrudes over the first surface). The closing member is supported by the distal end surface of the first support part abutting thereagainst. An entirety of the distal end surface may abut against the closing member. Alternatively, part (for example, a circumferential edge portion) of the distal end surface may abut against the closing member.

An external shape of the closing member is a shape confoaming to an internal shape (a cross-sectional shape in a width direction) of a housing of the gas generator, and a similar description applies to an external shape of the base of the support member.

A gas passage hole is formed in at least one of the base and the convex first support part.

When the base has a gas passage hole, the gas passage hole is a hole penetrating in a thickness direction, and the gas passage hole may be a hole in a perpendicular direction with respect to a surface of the base or a hole in an oblique direction with respect to the surface of the base.

When the convex first support part is a columnar first support part, the gas passage hole can be a hole penetrating the base in an oblique direction from a position proximal to the columnar first support part. When the convex first support part is a convex portion which protrudes over the first surface and has a concave portion formed from the second surface to the first surface, the gas passage hole can be a hole penetrating in the thickness direction (a hole penetrating a circumferential wall of a surface of the cup-like convex portion).

When attaching the support structure of a closing member according to the first aspect to a gas generator, a circumferential surface of the closing member is welded and fixed to the housing of the gas generator.

Moreover, in order to facilitate welding and fixing of the circumferential surface of the closing member, a thickness of the closing member (for example, a thickness of an outer circumferential portion) can be adjusted, or a groove, a step or the like can be formed on the housing of the gas generator to which the closing member is to be welded.

When the support structure of a closing member according to the first aspect is disposed in a gas discharge path in a gas generator, different effects are exhibited depending on a type of an inflating gas source chamber and on a positional relationship with the inflating gas source chamber.

(First Mode)

When the gas generator has a gas discharge path between a pressurized gas chamber and a normal-pressure space and the support structure is disposed such that the closing member of the support structure is on the side of the pressurized gas chamber and the support member is on the side of the normal-pressure space, two effects, i.e. a first effect and a second effect are exhibited.

(1) First Effect

Since the closing member is to be used in a state where a center portion of the closing member is supported by the convex first support part and the circumferential surface of the closing member is welded and fixed to the housing, pressure resistance performance of the closing member prior to actuation of the gas generator is improved. Therefore, a closing member with reduced thickness can be used.

(2) Second Effect

Since a comparison between the annular surface of the closing member not supported by the convex first support part and the remaining portion of the surface of the closing member supported by the convex first support part reveals a significant difference in strength (support strength), a rupture is likely to occur on the annular surface to open the gas discharge path at actuation of the gas generator.

When the annular surface of the closing member is ruptured, a portion abutted by the first support part of the closing member is held in a state of being torn in an approximately circular shape and being caught by the distal end surface of the first support part.

(Second Mode)

When the gas generator has a gas discharge path between a pressurized gas chamber and a combustion chamber and the support structure is disposed such that the closing member of the support structure is on the side of the combustion chamber and the support member of the support structure is on the side of the pressurized gas chamber, the second effect described above is exhibited.

(Third Mode)

When the gas generator has a gas discharge path between a pressurized gas chamber and a combustion chamber and the support structure is disposed such that the closing member of the support structure is on the side of the pressurized gas chamber and the support member of the support structure is on the side of the combustion chamber, the first effect described above is exhibited. An annular surface described in the present invention refers to a surface continuously formed in a circumferential direction and a shape thereof is not limited to any particular shape.

A support structure of a closing member for a gas generator according to the second aspect is disposed in a gas discharge path inside a cylindrical housing so that the closing member closes the discharge path and a support member supports the closing member.

With the support structure of a closing member for a gas generator according to the second aspect, the closing member is supported by an annular second support part and a convex first support part formed on a first surface of a base of the support member, and the closing member further includes an annular surface not supported by the two support parts.

The annular second support part is an annular wall which extends from a circumference of the first surface of the base.

The convex first support part has a columnar distal end surface formed on the first surface of the base, and the distal end surface may be a flat surface, a concave surface, a curved surface or the like. The convex first support part may be hollow but those with a cylindrical shape without a distal end surface are excluded.

The convex first support part may extend from the first surface of the base or may be a concave portion formed from a second surface to the first surface of the base (in other words, a cup-like convex portion which protrudes over the first surface). The closing member is supported by the distal end surface of the first support part abutting thereagainst. An entirety of the distal end surface may abut against the closing member. Alternatively, part (for example, a circumferential edge portion) of the distal end surface may abut against the closing member.

An external shape of the closing member is a shape containing to an internal shape (a cross-sectional shape in a width direction) of a housing of the gas generator, and a similar description applies to an external shape of the base of the support member.

An external shape of the annular second support part (a shape of an outside of a ring) is the same as the external shape of the support member, however, a shape of an inside of the ring of the annular second support part does not necessarily coincide with the shape of the outside of the ring.

A gas passage hole is formed in at least one of the base, the convex first support part and the annular second support part.

When the base has a gas passage hole, the gas passage hole is a hole penetrating in a thickness direction, and the gas passage hole may be a hole in a perpendicular direction with respect to a surface of the base or a hole in an oblique direction with respect to the surface of the base.

When the convex first support part is a columnar first support part, the gas passage hole can be a hole penetrating the base in an oblique direction from a position proximal to the columnar first support part.

When the convex first support part is a convex portion which protrudes over the first surface and has a concave portion formed from the second surface to the first surface, the gas passage hole can be a hole penetrating in the thickness direction (a hole penetrating a circumferential wall of a surface of the cup-like convex portion).

When the annular second support part has a gas passage hole, the gas passage hole is a hole penetrating in a thickness direction, and the gas passage hole may be a hole in a perpendicular direction with respect to a surface of the annular second support part or a hole in an oblique direction with respect to the surface of the annular second support part.

When attaching the support structure of a closing member according to the second aspect to a gas generator, in order to increase air tightness, a sealing agent is preferably applied between a circumferential surface of the closing member and the housing of the gas generator. The circumferential surface of the closing member and an inner wall surface of the housing may be welded to each other.

Moreover, in order to facilitate the application of the sealing agent, a thickness of the closing member (for example, a thickness of an outer circumferential portion) can be adjusted, or a groove, a step or the like can be formed on the housing of the gas generator against which the closing member is to be abutted.

When the support structure of a closing member according to the second aspect is disposed in a gas discharge path in a gas generator, different effects are exhibited depending on a type of an inflating gas source chamber and on a positional relationship with the inflating gas source chamber.

(First Mode)

When the gas generator has a gas discharge path between a pressurized gas chamber and a normal-pressure space and the support structure is disposed such that the closing member of the support structure is on the side of the pressurized gas chamber and the support member is on the side of the normal-pressure space, two effects, i.e. a first effect and a second effect are exhibited.

(1) First Effect

Since a center portion of the closing member is supported by the convex first support part, an outer circumferential edge portion of the closing member is supported by the annular second support part, and the closing member has an annular surface not abutted by the convex first support part and the annular second support part, pressure resistance performance of the closing member prior to actuation of the gas generator is improved. Therefore, a closing member with reduced thickness can be used.

(2) Second Effect

Since a comparison between the annular surface of the closing member not supported by the convex first support part and the annular second support part and the remaining portion of the surface of the closing member supported by the convex first support part and the annular second support part reveals a significant difference in strength (support strength), a rupture is likely to occur on the annular surface but fragments are less likely to be produced at actuation of the gas generator.

When the annular surface of the closing member is ruptured, a portion abutted by the convex first support part of the closing member is held in a state of being torn in an approximately circular shape and being caught by the distal end surface of the first support part.

(Second Mode)

When the gas generator has a gas discharge path between a pressurized gas chamber and a combustion chamber and the support structure is disposed such that the closing member of the support structure is on the side of the combustion chamber and the support member of the support structure is on the side of the pressurized gas chamber, the second effect described above is exhibited.

(Third Mode)

When the gas generator has a gas discharge path between a pressurized gas chamber and a combustion chamber and the support structure is disposed such that the closing member of the support structure is on the side of the pressurized gas chamber and the support member of the support structure is on the side of the combustion chamber, the first effect described above is exhibited. An annular surface described in the present invention refers to a surface continuously formed in a circumferential direction and a shape thereof is not limited to any particular shape.

In the support structures of a closing member for a gas generator according to the first aspect and the second aspect, preferably, the plate-shaped closing member has a bottom surface portion and a circumferential wall portion which extends in one direction from an outer circumference of the bottom surface portion, and the bottom surface portion on a side formed with the circumferential wall portion or, in other words, a side enclosed by the circumferential wall portion is a first surface and the back surface thereof is a second surface.

Using a closing member having the bottom surface portion and the circumferential wall portion is preferable since the closing member is easy to be attached inside the cylindrical housing of the gas generator.

In the support structures of a closing member for a gas generator according to the first aspect and the second aspect, preferably, the annular surface not abutted by the convex first support part, or the annular surface not abutted by the convex first support part and the annular second support part of the closing member has an annular fragile portion.

Using such a closing member provided with a fragile portion is preferable since the annular surface becomes easier to rupture.

In the support structures of a closing member for a gas generator according to the first aspect and the second aspect, preferably, the annular surface not abutted by the convex first support part, or the annular surface not abutted by the convex first support part and the annular second support part of the closing member has an annular fragile portion and further has a plurality of fragile portions which are radially formed so as to traverse the annular fragile portion.

Using such a closing member in which different fragile portions are formed is preferable since the annular surface becomes easier to rupture.

In the gas generator according to the present invention, one or both of the gas discharge path between the diffuser portion and the pressurized gas chamber and the gas discharge path between the combustion chamber and the pressurized gas chamber are closed by the support structure of a closing member according to the first aspect or the second aspect.

When the support structure of a closing member according to the first aspect is used in the gas generator according to the present invention, a circumferential surface of the closing member is welded and fixed to the cylindrical housing and a center portion of the closing member is supported by the first support part.

When the support structure of a closing member according to the second aspect is used in the gas generator according to the present invention, a center portion of the closing member is supported by the first support part and an outer circumferential edge portion of the closing member is supported by the second support part.

Since support strength with respect to the closing member is increased in this manner, durability of the closing member prior to the actuation of the gas generator is increased (the first effect).

Further, since a comparison between the annular surface of the closing member not supported by the support member and the remaining portion of the surface of the closing member supported by the support member reveals a significant difference in strength (support strength), a rupture is likely to occur on the annular surface at actuation of the gas generator. In this manner, the annular surface is readily cleavable and, because of the surface being annular, fragments are less likely to be produced during cleavage (second effect).

In the closing member, the annular surface preferably is provided with the fragile portion described above.

It is preferable that the present invention provides a gas generator, including:

a cylindrical housing having a first end which is attached with an ignition device and a second end which is on an opposite side from the first end and is attached with a diffuser portion with a gas discharge port;

a combustion chamber being filled with a gas generating agent and arranged on the side of the ignition device;

a pressurized gas chamber being filled with a pressurized gas as an inflating gas source and arranged on the side of the diffuser portion;

a gas discharge path between the diffuser portion and the pressurized gas chamber being closed by the support structure of a closing member according to the first aspect or the second aspect including the combination of the closing member and the support member, the diffuser portion corresponding to the support member of a support structure of a closing member, when the diffuser portion is a diffuser portion according to the second aspect, the diffuser portion including the base, the annular second support part which extends in one direction from a circumference of the base, and the convex first support part which extends in a same direction as the annular second support part from a center portion of the base, and the diffuser portion further including the gas discharge port in at least one of the annular second support part and the base in part where the annular second support part and the convex first support part are not formed, the closing member being disposed such that a first surface is on the side of the pressurized gas chamber and a second surface is on the side of the diffuser portion, the closing member being supported by the annular second support part of the diffuser portion which abuts against an outer circumferential edge portion on the second surface of the closing member and a distal end surface of the first support part of the diffuser portion which abuts against a center portion on the second surface of the closing member, and the closing member including an annular surface not abutted by the annular second support part and the convex first support part, during actuation, the closing member being annularly opened as the annular surface of the closing member is ruptured so that a gas is discharged from the gas discharge port.

In the gas generator according to the present invention, the gas discharge path between the diffuser portion and the pressurized gas chamber is closed by the support structure of a closing member according to the first aspect or the second aspect, and the support member also functions as a diffuser portion.

Since the diffuser portion which is the support member is fixed to a second end of the cylindrical housing, the diffuser portion (the support member) has a gas discharge port.

When the support structure of a closing member according to the first aspect is used in the gas generator according to the present invention, a circumferential surface of the closing member is welded and fixed to the cylindrical housing and a center portion of the closing member is supported by the first support part.

When the support structure of a closing member according to the second aspect is used in the gas generator according to the present invention, a center portion of the closing member is supported by the first support part and an outer circumferential edge portion of the closing member is supported by the second support part.

Since support strength with respect to the closing member is increased in this manner, durability of the closing member prior to the actuation of the gas generator is increased (the first effect).

Further, since a comparison between the annular surface of the closing member not supported by the support member (the diffuser portion) and the remaining portion of the surface of the closing member supported by the support member (the diffuser portion) reveals a significant difference in strength (support strength), cleavage is likely to occur in the annular surface at actuation of the gas generator. In this manner, the annular surface is easy to rupture and, because of the surface being annular, fragments are less likely to be produced during cleavage (the second effect).

In the closing member, the annular surface preferably is provided with the fragile portion described above.

It is preferable that the present invention provides a gas generator, including:

a cylindrical housing having a first end which is attached with an ignition device and a second end which is on an opposite side from the first end and is attached with a diffuser portion with a gas discharge port;

a combustion chamber being filled with a gas generating agent and arranged on the side of the ignition device;

a pressurized gas chamber being filled with a pressurized gas as an inflating gas source and arranged on the side of the diffuser portion;

a gas discharge path between the combustion chamber and the pressurized gas chamber being closed by the support structure of a closing member according to the first aspect or the second aspect including the combination of the closing member and the support member, the support member of the support structure of the closing member being disposed on the side of the pressurized gas chamber and the closing member being disposed on the side of the combustion chamber, the closing member being disposed such that a first surface is on the side of the combustion chamber and a second surface is on the side of the pressurized gas chamber, when the support member is a support member according to the second aspect, the closing member being supported by the annular second support part of the support member which abuts against an outer circumferential edge portion on the second surface of the closing member, and a distal end surface of the first support part which abuts against a center portion on the second surface of the closing member, and the closing member including an annular surface not abutted by the annular second support part and the convex first support part, during actuation, the closing member being annularly opened as the annular surface of the closing member is ruptured and the combustion chamber and the pressurized gas chamber are communicated with each other by the gas passage hole.

When the support structure of a closing member according to the first aspect is used in the gas generator according to the present invention, a circumferential surface of the closing member is welded and fixed to the cylindrical housing and a center portion of the closing member is supported by the first support part.

When the support structure of a closing member according to the second aspect is used in the gas generator according to the present invention, a center portion of the closing member is supported by the first support part and an outer circumferential edge portion of the closing member is supported by the second support part.

Since a comparison between the annular surface of the closing member not supported by the support member and the remaining portion of the surface of the closing member supported by the support member reveals a significant difference in strength (support strength), cleavage is likely to occur in the annular surface at actuation of the gas generator. In this manner, the annular surface is easy to rupture and, because of the surface being annular, fragments are less likely to be produced during cleavage (the second effect).

In the closing member, the annular surface preferably is provided with the fragile portion described above.

It is preferable that the present invention provides a gas generator, including:

a cylindrical housing having a first end which is attached with an ignition device, and a closed second end which is on an axially opposite side from the first end, a combustion chamber being filled therein with a gas generating agent and arranged on the side of the first end of the cylindrical housing;

a pressurized gas chamber being filled therein with a pressurized gas and arranged on the side of the second end of the cylindrical housing; and a gas inflow chamber being provided with a gas discharge port and arranged between the combustion chamber and the pressurized gas chamber;

a first closing member in which the support structure of a closing member according to the first aspect or the second aspect including the combination of the closing member and the support member is used, closing between the combustion chamber and the gas inflow chamber, and a second closing member closing between the pressurized gas chamber and the gas inflow chamber, a movable body, which is slidable in an axial direction upon actuation, being disposed in the combustion chamber or the gas inflow chamber, the movable body including a base slidable along an inner circumferential surface of the combustion chamber and a rod protruding from the base toward the gas inflow chamber or the second closing member, the base being the support member in the support structure of a closing member, and when the base is the support member according to the second aspect, the base including a convex first support part, which extends in the direction of the ignition device from a center portion of the base, and an annular second support part, which extends in the direction of the ignition device from a circumference of the base, and the base further including a gas passage hole in part where the convex first support part and the annular second support part of the base are not formed, the first closing member having a plate shape including a first surface on the side of the ignition device and a second surface on the side of the gas inflow chamber, the first closing member being supported by a distal end surface of the first support part of the base which abuts against a center portion of the second surface, and the annular second support part of the base which abuts against an outer circumferential edge portion of the second surface, and the first closing member including an annular surface not abutted by the convex first support part and the annular second support part, during actuation, the first closing member being opened as the annular surface of the first closing member is annularly ruptured, and the combustion chamber and the gas inflow chamber are communicated with each other by the gas passage hole.

In the gas generator according to the present invention, the gas discharge path between the combustion chamber and the gas inflow chamber having a gas discharge port is closed by the support structure of a closing member according to the first aspect or the second aspect described above.

The support member also functions as a base of a movable body for cleaving a second closing member.

When the support structure of a closing member according to the first aspect is used in the gas generator according to the present invention, a circumferential surface of the first closing member is welded and fixed to the cylindrical housing and a center portion of the first closing member is supported by the first support part.

When the support structure of a closing member according to the second aspect is used in the gas generator according to the present invention, a center portion of the first closing member is supported by the first support part and an outer circumferential edge portion of the first closing member is supported by the second support part.

Since support strength with respect to the first closing member is increased in this manner, durability of the closing member prior to the actuation of the gas generator is increased (the first effect).

Further, since a comparison between the annular surface of the first closing member not supported by the support portion (the movable base portion) and the remaining portion of the surface of the first closing member supported by the support portion (the movable base portion) reveals a significant difference in strength (support strength), cleavage is likely to occur in the annular surface at actuation of the gas generator. In this manner, the annular surface is easy to rupture and, because of the surface being annular, fragments are less likely to be produced during cleavage (the second effect).

In the first closing member, the annular surface preferably is provided with the fragile portion described above.

The support structure of a closing member for a gas generator according to the present invention is capable of increasing support strength with respect to the closing member for closing a gas discharge path of the gas generator and making gas discharge performance unaffected by fragments of the closing member.

A gas generator using the support structure of a closing member for a gas generator according to the present invention is capable of increasing durability of the closing member prior to actuation even when a thin closing member is used and, by making the closing member to be ruptured at a portion not supported with the support member and by using a thin closing member, the closing member is easier to rupture during actuation and fragments are less likely to be produced.

The support structure of a closing member for a gas generator according to the present invention is used in a gas generator for an airbag system of an automobile.

A gas generator mounted with the support structure of a closing member according to the present invention is used in an airbag system of an automobile.

Embodiments of Invention

<Support Structure of Closing Member for Gas Generator Shown in FIG. 1>

A support structure of a closing member for a gas generator according to the first aspect shown in FIGS. 1 and 2 is used in a gas generator, in which a cylindrical housing has a diffuser portion (a gas discharge port), accommodates therein an ignition device (including an igniter) and has an inflating gas source chamber filled with an inflating gas source, in order to close a gas discharge path between the diffuser portion (the gas discharge port) and the inflating gas source chamber.

The support structure of a closing member according to the present invention is preferably made of a same material as a housing of the gas generator and is preferably made of iron, stainless steel, or the like.

The inflating gas source chamber is referred as a space filled with a gas generating agent, a space filled with a pressurized gas (argon, helium, or the like), and a space filled with both a gas generating agent and a pressurized gas, as a gas source.

The gas generating agent used throughout all of the embodiments described hereinafter may be a gas generating agent supplying an inflating gas or may be a gas generating agent supplying heat for heating the inflating gas source filled in the pressurized gas chamber.

A support structure 1A of a closing member shown in FIG. 1 includes a combination of a closing member 2 and a support member 10A of the closing member 2.

The support member 10A includes a base 11, and a convex first support part 13 extending in one direction from a center portion of a first surface 11a of the base 11. A distal end surface of the first support part 13 is a flat surface.

A plurality of gas passage holes 15a which penetrate from the first surface 11a to a second surface 11b are formed in the base 11. The plurality of the gas passage holes 15a are formed equidistantly in a circumferential direction.

The closing member 2 includes a bottom surface portion 3 and a circumferential wall portion 4 extending in one direction from an outer circumference of the bottom surface portion 3. The bottom surface portion 3 and the circumferential wall portion 4 are integrally formed.

In the closing member 2, the bottom surface portion 3 on a side enclosed by the circumferential wall portion 4 is a first surface 3a and the back surface thereof is a second surface 3b.

With respect to the closing member 2 and the base 11 of the support member 10A, the base 11 has a larger outer diameter.

The closing member 2 is supported by the distal end surface of the first support part 13 abutting against a center portion of the second surface 3b. In FIG. 1, an entire distal end surface of the first support part 13 abuts against the second surface 3b. The abutting portion between the bottom surface portion 3 and the convex first support part 13 can be welded.

The closing member 2 has an annular surface 5 in the bottom surface portion 3 in part where the convex first support part 13 is not abutted.

In addition to a circular shape, the annular surface 5 can be in a polygonal shape or, preferably, in a polygonal shape with chamfered corners.

As shown in (a) in FIG. 2, the annular surface 5 of the closing member 2 preferably has an annular fragile portion 6 in order to facilitate cleavage.

While the annular fragile portion 6 is formed at an intermediate position (a position of ½X) of a width (X) of the annular surface 5, the annular fragile portion 6 can be formed closer to the circumferential wall portion 4 or closer to a center portion relative to the position shown in (a) in FIG. 2.

Further, as shown in (b) in FIG. 2, the annular surface 5 of the closing member 2 can include a plurality of fragile portions 7 which are radially formed so as to traverse the annular fragile portion 6.

The fragile portion 6 and the fragile portions 7 are portions with lower burst strength than other portions. For example, the fragile portions may be a V-shaped notch in a cross-sectional shape in a width direction.

The fragile portion 6 and the fragile portions 7 may be continuously formed or may be discontinuously formed in a dotted line pattern.

Although the fragile portion 6 and the fragile portions 7 are shown by dotted lines in (a) and (b) in FIG. 2, the dotted lines simply represent formation positions and are not intended to suggest that a preferable embodiment includes forming these fragile portions in a dotted line pattern.

The support structure 1A of a closing member shown in FIG. 1 is used to close the gas discharge path between the gas discharge port and the inflating gas source chamber in the gas generator.

When attaching the support structure 1A of a closing member to the gas generator, the first surface 11a of the base of the support member 10A is welded and fixed to the housing of the gas generator and, subsequently, the circumferential wall portion 4 of the closing member 2 is welded and fixed to the housing of the gas generator.

The first surface 3a of the closing member 2 is a surface facing the igniter when attached to the gas generator and the second surface 3b of the closing member 2 is a surface facing the gas discharge port when attached to the gas generator.

While the closing member 2 is ruptured to the side of the second surface 3b under pressure from the side of the first surface 3a upon actuation of the gas generator, at this point, cleavage occurs at the annular surface 5 which is not supported by the convex first support part 13 and a portion supported by the convex first support part 13 is not ruptured.

<Gas Generator Shown in FIG. 3>

FIG. 3 shows a gas generator 100A including the support structure 1A of a closing member shown in FIG. 1. The gas generator 100A has the same structure as the hybrid inflator shown in FIG. 1 of JP-A No. 2008-174215 except that the support structure of a closing member according to the present invention is used.

The gas generator 100A includes a pressurized gas chamber 120, a gas generating chamber (a combustion chamber) 130, and a diffuser portion 50.

An outer shell of the pressurized gas chamber 120 is formed by a cylindrical pressurized gas chamber housing 122, and the pressurized gas chamber 120 is filled with a pressurized gas including a mixture of argon and helium.

Since the pressurized gas chamber housing 122 is symmetrical in an axial direction and in a radial direction, an orientation of the pressurized gas chamber housing 122 in the axial direction and in the radial direction need not be adjusted during assembly.

A pressurized gas filling hole 124 is formed on a side surface of the pressurized gas chamber housing 122 and is closed by a pin 126 after the pressurized gas is loaded.

A distal end portion 126a of the pin 126 protrudes inside the pressurized gas chamber 120, and a protruding portion has a length which allows collision with a combustion gas flow of a gas generating agent. By adjusting the length of the protruding portion of the pin 126, combustion gas can be caused to collide with the pin 126 itself and cause combustion residue to adhere to the pin 126.

The gas generating chamber 130 includes an ignition device (an electric igniter) 134 and a solid gas generating agent 136 accommodated inside a gas generating chamber housing 132, and the gas generating chamber 130 is connected to one end of the pressurized gas chamber 120.

The gas generating chamber 130 is a combustion chamber in which the solid gas generating agent 136 is burnt.

The gas generating chamber housing 132 and the pressurized gas chamber housing 122 are resistance-welded to each other at a joint portion 149.

When the gas generator 100A is incorporated into an airbag system, the igniter 134 is connected to a power supply via a connector, a lead wire, or the like.

The solid gas generating agent 136 includes 10 to 35 mass % of nitroguanidine as a fuel, 10 to 50 mass % of potassium perchlorate as an oxidizing agent, and 30 to 80 mass % of carboxymethylcellulose sodium salt as a binder, and has a nitroguanidine/potassium perchlorate mass ratio of more than 0.35 and less than 0.95.

A first communication hole 138 serving as a gas discharge path between the pressurized gas chamber 120 and the gas generating chamber 130 is closed by a first rupturable plate 140 deformed in a bowl shape, and the inside of the gas generating chamber 130 is kept at normal pressure. The first rupturable plate 140 is resistance-welded to the gas generating chamber housing 132 at a circumferential edge portion 140a.

The support structure 1A of a closing member according to the present invention shown in FIG. 1 is attached to another end of the pressurized gas chamber 120 and the support member 10A shown in FIG. 1 serves as the diffuser portion 50.

The diffuser portion 50 includes a base 51 and a convex first support part 53 extending in one direction from a center portion of a first surface 51a of the base 51. A distal end surface of the first support part 53 is a flat surface.

The diffuser portion 50 is welded and fixed to the cylindrical pressurized gas chamber housing 122 at an outer circumferential edge portion of the first surface 51a of the base.

The base 51 has a plurality of the gas discharge ports 55 formed so as to penetrate from the first surface 51a to a second surface 51b. The plurality of the gas discharge ports 55 are formed equidistantly in the circumferential direction.

In the gas generator 100A shown in FIG. 3, since the diffuser portion 50 is the support member 10A shown in FIG. 1, the plurality of the gas passage holes 15a shown in FIG. 1 are the gas discharge ports 55.

A closing member 60 includes a bottom surface portion 61 and a circumferential wall portion 62 extending toward the igniter 134 from an outer circumference of the bottom surface portion 61. The bottom surface portion 61 and the circumferential wall portion 62 are integrally formed.

In the closing member 60, the circumferential wall portion 62 is welded and fixed to the cylindrical pressurized gas chamber housing 122.

In the closing member 60, the bottom surface portion 61 on a side where the circumferential wall portion 62 is formed is a first surface 61a and the back surface thereof is a second surface 61b.

The first surface 61a of the closing member 60 is a surface on the side of the igniter 134 and the second surface 61b of the closing member 60 is a surface on the side of the gas discharge ports 55.

An outer surface of the circumferential wall portion 62 is abutted against an inner wall surface 122a of the pressurized gas chamber housing 122.

The closing member 60 is supported by the distal end surface of the first support part 53 of the diffuser portion 50 abutting against a center portion of the second surface 61b.

The second surface 61b of the bottom surface portion 61 includes an annular surface 65 which is not abutted by the convex first support part 53.

A same annular fragile portion 64 as the annular fragile portion 6 shown in (a) in FIG. 2 is formed on the annular surface 65.

An operation of an embodiment, in which the gas generator 100A shown in FIG. 3 is incorporated into an airbag system mounted to an automobile, will be described.

When the automobile collides and receives the impact, an actuation signal output device causes the igniter 134 to actuate and ignite, and the gas generating agent 136 is burnt to generate a high-temperature combustion gas.

Subsequently, due to a rise in pressure inside the gas generating chamber 130 caused by the high-temperature combustion gas, the first rupturable plate 140 breaks, the first communication hole 138 serving as a gas discharge path between the gas generating chamber 130 and the pressurized gas chamber 120 opens, and the combustion gas is discharged into the pressurized gas chamber 120.

While the closing member 60 is supported by the first support part 53 (the first effect) prior to actuation of the igniter 134, due to a rise in pressure inside the pressurized gas chamber 120, the annular surface 65 of the closing member 60 is ruptured in an annular shape along the fragile portion 64, the gas discharge path from the pressurized gas chamber 120 to the gas discharge ports 55 opens, and the gas is discharged from the gas discharge ports 55 to inflate an airbag.

At this point, due to the second effect, the annular surface 65 is readily cleavable and fragments are less likely to be created.

Further, while a cleavage fragment is separated into two, namely an annular cleavage fragment of the circumferential wall portion 62 and a circular cleavage fragment in a center portion, the circular cleavage fragment in the center portion has a larger area than the portion being supported by the distal end surface of the first support part 53. Therefore, since the circular cleavage fragment is more readily hooked by the first support part 53, the circular cleavage fragment does not block the discharge path, and gas discharge is less affected.

<Support Structures of Closing Member for Gas Generators Shown in FIGS. 4 to 6>

Support structures of a closing member for a gas generator according to the second aspect shown in FIGS. 4 to 6 are used in a gas generator, in which a cylindrical housing has a gas discharge port, accommodates therein an ignition device (including an igniter) and has an inflating gas source chamber filled with an inflating gas source, in order to close between the gas discharge port and the inflating gas source chamber.

The support structures of a closing member according to the present invention is preferably made of a same material as a housing of the gas generator and is preferably made of iron, stainless steel, or the like.

The inflating gas source chamber indicates a space filled with a gas generating agent, a space filled with a pressurized gas (argon, helium, or the like) and a space filled with both a gas generating agent and a pressurized gas, as a gas source.

A support structure 1C of a closing member shown in (a) in FIG. 4 includes a combination of a closing member 2 and a support member 10C of the closing member 2.

The support member 10C includes a base 11, a convex first support part 13, which extends in one direction from a center portion of a first surface 11a of the base 11, and an annular second support part 12 which extends in a same direction as the first support part 13 from a circumference of the base 11. Heights of the annular second support part 12 and the convex first support part 13 from the base 11 are the same. A distal end surface of the first support part 13 is a flat surface.

In the annular second support part 12, a plurality of the gas passage holes 15b are formed equidistantly in a circumferential direction.

The closing member 2 includes a bottom surface portion 3 and a circumferential wall portion 4 extending in one direction from an outer circumference of the bottom surface portion 3. The bottom surface portion 3 and the circumferential wall portion 4 are integrally formed.

In the closing member 2, the bottom surface portion 3 on a side enclosed by the circumferential wall portion 4 is a first surface 3a and the back surface thereof is a second surface 3b.

The closing member 2 is supported by the distal end surface of the first support part 13, which abuts against a center portion of the second surface 3b, and the annular second supporting member 12 which abuts against an outer circumferential edge portion of the second surface 3b. In FIG. 4, an entire distal end surface of the first support part 13 abuts against the second surface 3b. The abutting portion between the bottom surface portion 3 and the convex first support part 13 can be welded.

The second surface 3b has an annular surface 5 in the bottom surface portion 3 in part where the annular second support part 12 and the convex first support part 13 are not abutted.

In addition to a circular shape, the annular surface 5 can be in a polygonal shape or, preferably, in a polygonal shape with chamfered corners.

As shown in (b) in FIG. 4, the annular surface 5 of the closing member 2 preferably has an annular fragile portion 6 in order to facilitate cleavage.

While the annular fragile portion 6 is formed at an intermediate position (a position of ½X) of a width (X) of the annular surface 5, the annular fragile portion 6 can be formed closer to the circumferential wall portion 4 or closer to a center portion relative to the position shown in (b) in FIG. 4.

Further, as shown in (c) in FIG. 4, the annular surface 5 of the closing member 2 can include a plurality of fragile portions 7 which are radially formed so as to traverse the annular fragile portion 6.

The fragile portion 6 and the fragile portions 7 are portions with lower burst strength than other portions. For example, the fragile portions may be a V-shaped notch in a cross-sectional shape in a width direction.

The fragile portion 6 and the fragile portions 7 may be continuously formed or may be discontinuously formed in a dotted line pattern.

Although the fragile portion 6 and the fragile portions 7 are shown by dotted lines in (b) and (c) in FIG. 4, the dotted lines simply represent formation positions and are not intended to suggest that a preferable embodiment includes forming these fragile portions in a dotted line pattern.

In FIG. 4, the width (X) of the annular surface 5 and a distance (Y) from the annular surface 5 (the second surface 3b) to the gas passage holes 15a satisfy a relationship expressed as ½X<Y. This prevents a ruptured portion from coming into contact with the gas passage holes 15b and inhibiting gas flow when the annular surface 5 is ruptured at the fragile portion 6. Even when a position of the fragile portion is changed as described above, the position of the rupturable portion has to be adjusted not to come into contact with the gas passage holes 15b.

Even when the fragile portion 6 is not formed, since stress is maximized at the position of ½X and makes the position of ½X readily cleavable, the relationship expressed as ½X<Y can be satisfied.

The support structure 1C of a closing member shown in (a) in FIG. 4 is used to close between the gas discharge port and the inflating gas source chamber in the gas generator.

The first surface 3a of the closing member 2 is a surface facing the igniter when attached to the gas generator and the second surface 3b of the closing member 2 is a surface facing the gas discharge port when attached to the gas generator.

While the closing member 2 is ruptured to the side of the second surface 3b under pressure from the side of the first surface 3a upon actuation of the gas generator, at this point, cleavage occurs at the annular surface 5 which is not supported by the supporting member 10C and a portion supported by the supporting member 10C is not ruptured.

A support structure 1D of a closing member shown in FIG. 5 is the same as the support structure 1C of a closing member shown in FIG. 4 with the exception of a formation position of a gas passage hole.

The plurality of the gas passage holes 15a are annularly formed at intervals in the base 11 of a support member 10D.

The annular fragile portion 6 is formed in an intermediate position of a width (X) of the annular surface 5 in order to increase cleavability.

The width (X) of the annular surface 5 and a distance (Z) from the annular surface 5 to the gas passage holes 15a satisfy a relationship expressed as ½X<Z. This prevents a ruptured portion from coming into contact with the gas passage holes 15a and inhibiting gas flow when the annular surface 5 is ruptured at the fragile portion 6.

Even when a position of the fragile portion is changed as described above, the position of the rupturable portion has to be adjusted not to come into contact with the gas passage holes 15a.

Even when the fragile portion 6 is not formed, since stress is maximized at the position of ½X and makes the position of ½X readily cleavable, the relationship expressed as ½X<Z can be satisfied.

A support structure 1E of a closing member shown in FIG. 6 is the same as the support structure 1C of a closing member shown in FIG. 4 with the exception of a formation position of a gas passage hole.

The plurality of the gas passage holes 15b are formed in a circumferential direction in the annular second support part 12, and the plurality of the gas passage holes 15a are annularly formed in the base 11.

<Gas Generator Shown in FIG. 7>

FIG. 7 shows a gas generator 100B which includes a support structure of a closing member according to the present invention. The gas generator 100B has a same structure as the gas generator 100A shown in FIG. 3 except that the support structure of a closing member is different.

The gas generator 100B includes a pressurized gas chamber 120, a gas generating chamber (a combustion chamber) 130, and a diffuser portion 50.

An outer shell of the pressurized gas chamber 120 is formed by a cylindrical pressurized gas chamber housing 122, and the pressurized gas chamber 120 is filled with a pressurized gas including a mixture of argon and helium.

Since the pressurized gas chamber housing 122 is symmetrical in an axial direction and in a radial direction, an orientation of the pressurized gas chamber housing 122 in the axial direction and in the radial direction need not be adjusted during assembly.

A pressurized gas filling hole 124 is formed on a side surface of the pressurized gas chamber housing 122 and is closed by a pin 126 after the pressurized gas is loaded.

A distal end portion 126a of the pin 126 protrudes inside the pressurized gas chamber 120, and a protruding portion has a length which allows collision with a combustion gas flow of a gas generating agent. By adjusting the length of the protruding portion of the pin 126, combustion gas can be caused to collide with the pin 126 itself and cause combustion residue to adhere to the pin 126.

The gas generating chamber 130 includes an ignition device (an electric igniter) 134 and a solid gas generating agent 136 accommodated inside a gas generating chamber housing 132 and is connected to one end of the pressurized gas chamber 120.

The gas generating chamber 130 is a combustion chamber in which the solid gas generating agent 136 is burnt.

The gas generating chamber housing 132 and the pressurized gas chamber housing 122 are resistance-welded to each other at a joint portion 149.

When the gas generator 100B is incorporated into an airbag system, the igniter 134 is connected to a power supply via a connector, a lead wire, or the like.

The solid gas generating agent 136 includes 10 to 35 mass % of nitroguanidine as a fuel, 10 to 50 mass % of potassium perchlorate as an oxidizing agent, and 30 to 80 mass % of carboxymethylcellulose sodium salt as a binder, and has a nitroguanidine/potassium perchlorate mass ratio of more than 0.35 and less than 0.95.

A first communication hole 138 serving as a gas discharge path between the pressurized gas chamber 120 and the gas generating chamber 130 is closed by a first rupturable plate 140 deformed in a bowl shape and the inside of the gas generating chamber 130 is kept at normal pressure. The first rupturable plate 140 is resistance-welded to the gas generating chamber housing 132 at a circumferential edge portion 140a.

The support structure 1C of a closing member according to the present invention shown in (a) in FIG. 4 is attached to another end of the pressurized gas chamber 120 and the support member 10C shown in (a) in FIG. 4 serves as the diffuser portion 50.

The diffuser portion 50 includes a base 51, a convex first support part 53, which extends in one direction from a center portion of the base 51, and an annular second support part 52 which extends in a same direction as the convex first support part 53. A distal end surface of the first support part 53 is a flat surface.

Further, the diffuser portion 50 has a flange portion 54 extending radially outward from the annular second support part 52, and both the annular second support part 52 and the flange portion 54 function as the annular second support part 12 shown in (a) in FIG. 4.

The diffuser portion 50 is welded and fixed to the cylindrical pressurized gas chamber housing 122 at the flange portion 54.

The annular second support part 52 has a plurality of the gas discharge ports 55 formed equidistantly in the circumferential direction.

In the gas generator 100B shown in FIG. 7, since the diffuser portion 50 is the support member 10C shown in (a) in FIG. 4, the plurality of the gas passage holes 15b shown in (a) in FIG. 4 are the gas discharge ports 55.

A closing member 60 includes a bottom surface portion 61 and a circumferential wall portion 62 extending toward the igniter 134 from an outer circumference of the bottom surface portion 61. The bottom surface portion 61 and the circumferential wall portion 62 are integrally formed.

The circumferential wall portion 62 is welded and fixed to the pressurized gas chamber housing 122 to maintain airtightness in the pressurized gas chamber 120.

In the closing member 60, the bottom surface portion 61 on a side enclosed by the circumferential wall portion 62 is a first surface 61a and the back surface thereof is a second surface 61b.

The first surface 61a of the closing member 60 is a surface on the side of the igniter 134 and the second surface 61b of the closing member 60 is a surface on the side of the gas discharge ports 55.

An outer surface of the circumferential wall portion 62 is abutted against an inner wall surface 122a of the pressurized gas chamber housing 122.

The closing member 60 is supported by the distal end surface of the first support part 53 of the diffuser portion 50, which abuts against a center portion of the second surface 61b, and the flange portion 54 of the diffuser portion 50 which abuts against an outer circumferential edge portion of the second surface 61b.

In the closing member 60, the bottom surface portion 61 includes an annular surface 65 which is not abutted by the convex first support part 53 and the flange portion 54.

A same annular fragile portion 64 as the annular fragile portion 6 shown in (b) in FIG. 4 is formed on the annular surface 65.

<Embodiments Shown in FIGS. 8 to 11>

The gas generator 100B shown in FIG. 7 may include a diffuser portion (a support member) and a closing member according to any one of the embodiments shown in (a) in FIG. 8, (a) in FIG. 9, FIG. 10 and FIG. 11.

A diffuser portion 150 shown in (a) in FIG. 8 includes a base 151, a convex first support part 153, which extends from a center portion of the base 151, and an annular second support part 152 which extends in a same direction as the first support part 153 from a circumference of the base 151.

The convex first support part 153 has a depressed shape (a cup shape) in which a concave portion 153a is formed at the center portion of the base 151, and a bottom surface thereof is closed.

Further, the diffuser portion 150 includes a flange portion 154 extending radially outward from the annular second support part 152, and both the annular second support part 152 and the flange portion 154 function as the annular second support part 12 shown in (a) in FIG. 4.

The diffuser portion 150 is welded and fixed to the cylindrical pressurized gas chamber housing 122 at the flange portion 154.

Gas passage holes 155a serving as a plurality of the gas discharge ports are formed equidistantly in a circumferential direction in the base 151.

The closing member 60 includes the bottom surface portion 61 and the circumferential wall portion 62 extending toward the igniter 134 from an outer circumference of the bottom surface portion 61.

In the closing member 60, the bottom surface portion 61 on a side where the circumferential wall portion 62 is formed is the first surface 61a and the back surface thereof is the second surface 61b.

The first surface 61a of the closing member 60 is a surface on the side of the igniter 134 and the second surface 61b of the closing member 60 is a surface on the side of the gas discharge ports 155a.

An outer surface of the circumferential wall portion 62 is abutted against the inner wall surface 122a of the pressurized gas chamber housing 122 and sealed by welding or the like.

The closing member 60 is supported by the convex first support part 153 of the diffuser portion 150, which abuts against the center portion of the second surface 61b, and the flange portion 154 of the diffuser portion 150 which abuts against the outer circumferential edge portion of the second surface 61b.

Since the first support part 153 has a cup-shaped cross section and the bottom surface is a closed end surface, the closed end surface abuts against the second surface 61b of the closing member 60. In FIG. 8, an entire end surface abuts against the closing member 60.

The bottom surface portion 61 has the annular surface 65 in the second surface 61b in part where the flange portion 154 and the convex first support part 153 are not abutted.

The same annular fragile portion 64 as the annular fragile portion 6 shown in (b) in FIG. 4 is formed on the annular surface 65.

(a) in FIG. 9 shows the same support structure of the diffuser portion 150 and the closing member 60 as shown in (a) in FIG. 8 except that gas discharge ports are formed at a different position and the closing member 60 is partially welded to the first support part 153.

Gas passage holes 155b serving as a plurality of the gas discharge ports are formed at intervals in a circumferential direction in the annular second support part 152 of the diffuser portion 150.

In the closing member 60, a portion abutting against the distal end surface of the convex first support part 153 is welded (a welded portion 70).

FIG. 10 shows the same support structure of the diffuser portion 150 and the closing member 60 as shown in (a) in FIG. 8 except that gas discharge ports are formed at a different position.

Gas passage holes 155b serving as the plurality of the gas discharge ports are formed in a circumferential direction in the annular second support part 152 of the diffuser portion 150 and gas passage holes 155a serving as the plurality of the gas discharge ports are formed in a circumferential direction in the base 151 of the diffuser portion 150.

FIG. 11 shows the same support structure of the diffuser portion 150 and the closing member 60 as shown in (a) in FIG. 8 except that gas discharge ports are formed at a different position.

Gas passage holes 155c serving as the plurality of the gas discharge ports are formed in a circumferential wall surface of the concave portion 153a of the convex first support part 153 of the diffuser portion 150.

The gas discharge ports 155c are formed obliquely with respect to an axial direction (an axial direction of the pressurized gas chamber housing 122) in FIG. 11. However, the gas discharge ports 155c may be formed in a direction perpendicular to the axial direction.

Moreover, the plurality of the gas discharge ports may be a combination of the gas discharge ports 155a shown in FIG. 8, the gas discharge ports 155b shown in FIG. 9 and the gas discharge ports 155c shown in FIG. 11. Further, the welded portion 70 shown in FIG. 9 may be provided in the diffuser portion 150 shown in FIG. 8, 10, and FIG. 11.

An operation of an embodiment, in which a support structure combining the diffuser portion 150 and the closing member 60 shown in (a) in FIG. 8 or (a) in FIG. 9 is used, will be described when the gas generator 100B shown in FIG. 7 is incorporated into an airbag system mounted to an automobile.

Prior to actuation, the closing member 60 is supported by the flange portion 154 and the convex first support part 153 (the first effect).

When the automobile collides and receives the impact, an actuation signal output device causes the igniter 134 to actuate and ignite, and the gas generating agent 136 is burnt to generate a high-temperature combustion gas.

Subsequently, due to a rise in pressure inside the gas generating chamber 130 caused by the high-temperature combustion gas, the first rupturable plate 140 breaks and gas is discharged from the opened first communication hole 138 into the pressurized gas chamber 120.

As shown in (b) in FIG. 8, due to a rise in pressure inside the pressurized gas chamber 120, the annular surface 65 of the closing member 60 is annularly ruptured along the fragile portion 64 and is readily separated into two cleavage fragments, namely, an annular cleavage fragment 62a and a circular cleavage fragment 61a. At this point, other fragments are not created (the second effect).

Since the annular cleavage fragment 62a is abutted against the flange portion 154 and the pressurized gas chamber housing 122 and fixed to the pressurized gas chamber housing 122 by welding, by a stepped surface of the flange portion 154, or the like, the annular cleavage fragment 62a is undetachable therefrom.

Since the circular cleavage fragment 61a is pressed against the convex first support part 153 by a gas flow directed toward the gas discharge ports 155a or toward the gas discharge ports 155b from the pressurized gas chamber 120, the circular cleavage fragment 61a is undetachable from the convex first support part 153.

As shown in (b) in FIG. 9, due to a rise in pressure inside the pressurized gas chamber 120, the annular surface 65 of the closing member 60 is annularly ruptured along the fragile portion 64 and is readily separated into two cleavage fragments, namely, an annular cleavage fragment 62a and the circular cleavage fragment 61a. At this point, other fragments are not created (the second effect).

Since the annular cleavage fragment 62a is abutted against the flange portion 154 and the pressurized gas chamber housing 122 and fixed to the pressurized gas chamber housing 122 by welding, by the stepped surface formed between the pressurized gas chamber housing 122 and the flange portion 154, or the like, the annular cleavage fragment 62a is undetachable therefrom.

The circular cleavage fragment 61a remains in a state of being welded and fixed to the convex first support part 153 at the welded portion 70.

Since the closing member 60 is ruptured and separated into two in this manner, the gas discharge path from the pressurized gas chamber 120 to the gas discharge ports 155a or the gas discharge ports 155b is opened, a gas is discharged from the gas discharge ports 155a or the gas discharge ports 155b to inflate an airbag.

At this point, in (b) in FIG. 8, since the width (X) of the annular surface 65 and the distance (Z) between the annular surface 65 and the gas discharge ports 155a satisfy a relationship expressed as $\frac{1}{2}X < Z$, the cleavage of the closing member 60 does not impair discharge of the gas (a gas mixture of a pressurized gas and a combustion gas) from the gas discharge ports 155a.

Further, in (b) in FIG. 9, since the width (X) of the annular surface 65 and the distance (Y) between the annular surface 65 and the gas passage holes 155b satisfy a relationship expressed as $\frac{1}{2}X < Y$, the cleavage of the closing member 60 does not impair discharge of the gas (a gas mixture of a pressurized gas and a combustion gas) from the gas discharge ports 155b.

An embodiment, in which a support structure combining the diffuser portion 150 and the closing member 60 shown in FIG. 10 is used, operates in a similar manner to (a) and (b) in FIG. 8 and (a) and (b) in FIG. 9.

In the embodiment shown in FIG. 10, since both $\frac{1}{2}X < Y$ and $\frac{1}{2}X < Z$ are satisfied, the cleavage of the closing member 60 does not impair discharge of the gas (a gas mixture of a pressurized gas and a combustion gas) from the gas discharge ports 155a and the gas discharge ports 155b.

An embodiment, in which a support structure combining the diffuser portion 150 and the closing member 60 shown in FIG. 11 is used, operates in a similar manner to (a) and (b) in FIG. 8 and (a) and (b) in FIG. 9.

In the embodiment shown in FIG. 11, since $\frac{1}{2}X < Y$ is satisfied, the cleavage of the closing member 60 does not impair discharge of the gas (a gas mixture of a pressurized gas and a combustion gas) from the gas discharge ports 155*c*.

<Gas Generator Shown in FIG. 12>

A gas generator 100C shown in FIG. 12 is the same as the gas generator 100B shown in FIG. 7 except that the gas discharge path between the pressurized gas chamber 120 and the gas generating chamber (the combustion chamber) 130 is closed by the support structure 1D of a closing member shown in FIG. 5.

Hereinafter, only portions that differ from the gas generator 100B shown in FIG. 7 will be described.

The support structure 1D of a closing member according to the present invention shown in FIG. 5 is attached as a first closing member to the gas discharge path between the pressurized gas chamber 120 and the gas generating chamber (combustion chamber) 130.

The first closing member includes a combination of a support member 180 and a closing member 190.

The support member 180 includes a base 181, a convex first support part 183, which extends in one direction from a center portion of the base 181, and an annular second support part 182 which extends in a same direction as the convex first support part 183. A distal end surface of the first support part 183 is a flat surface.

The base 181 has a plurality of the gas discharge ports 185 formed equidistantly in the circumferential direction.

The annular second support part 182 and an inner wall surface 132*a* of a gas generating chamber housing are welded and fixed to each other.

The closing member 190 includes a bottom surface portion 191 and a circumferential wall portion 192 extending toward the igniter 134 from an outer circumference of the bottom surface portion 191.

In the closing member 190, the circumferential wall portion 192 is welded and fixed to the gas generating chamber housing 132.

The closing member 190 is supported by a distal end surface of the first support part 183, which abuts against a center portion of the closing member 190, and the annular second support part 182 which abuts against an outer circumferential edge portion of the closing member 190.

The closing member 190 has an annular surface 195 in a bottom surface portion 191 in part where the convex first support part 183 and the annular second support part 182 are not abutted.

A same annular fragile portion as the annular fragile portion 6 shown in (b) in FIG. 4 is formed on the annular surface 195. In FIG. 12, the closing member 190 is disposed on the side of the gas generating chamber (the combustion chamber) 130 and the support member 180 is disposed on the side of the pressurized gas chamber 120.

Part of an operation of an embodiment, in which the gas generator 100C shown in FIG. 12 is incorporated into an airbag system mounted to an automobile, will be described.

When the automobile collides and receives the impact, an actuation signal output device causes the igniter 134 to actuate and ignite, and the gas generating agent 136 is burnt to generate a high-temperature combustion gas.

The closing member 190 is annularly ruptured by the combustion gas along the fragile portion 64 formed on the annular surface 195 and opens the gas discharge path from the gas generating chamber 130 to the pressurized gas chamber 120. A state of cleavage at this point is the same as that shown in (b) in FIG. 8 and (b) in FIG. 9 and the second effect is exhibited.

Subsequently, a similar operation to the gas generator 100B shown in FIG. 7 is performed.

<Gas Generator Shown in FIG. 13>

A gas generator 100D shown in FIG. 13 is the same as the gas generator 100B shown in FIG. 7 except that the gas discharge path between the pressurized gas chamber 120 and the gas generating chamber (the combustion chamber) 130 is closed by the support structure 1D of a closing member shown in FIG. 5.

Further, the gas generator 100D shown in FIG. 13 is the same as the gas generator 100C shown in FIG. 12 except that the support structure 1D of a closing member is attached in a reverse manner (the closing member 190 is arranged on the side of the pressurized gas chamber 120 and the support member 180 is arranged on the side of the gas generating chamber (the combustion chamber) 130).

Hereinafter, only portions that differ from the gas generator 100B shown in FIG. 7 will be described.

The support structure 1D of a closing member according to the present invention shown in FIG. 5 is attached as a first closing member to the gas discharge path between the pressurized gas chamber 120 and the gas generating chamber (the combustion chamber) 130.

The first closing member includes a combination of the support member 180 and the closing member 190.

The support member 180 includes the base 181, the convex first support part 183, which extends in one direction from a center portion of the base 181, and the annular second support part 182 which extends in a same direction as the first support part 183 from a circumference of the base 181. A distal end surface of the first support part 183 is a flat surface.

A plurality of the gas passage holes 185 are formed equidistantly in a circumferential direction in the base 181.

The annular second support part 182 and the inner wall surface 132*a* of a gas generating chamber housing are welded and fixed to each other.

The closing member 190 includes a bottom surface portion 191 and the circumferential wall portion 192 extending toward the diffuser portion 50 from an outer circumference of the bottom surface portion 191.

In the closing member 190, the circumferential wall portion 192 is welded and fixed to the gas generating chamber housing 132.

The closing member 190 is supported by a distal end surface of the first support part 183, which abuts against a center portion of the closing member 190, and the annular second support part 182 which abuts against an outer circumferential edge portion of the closing member 190.

The closing member 190 has an annular surface 195 in a bottom surface portion 191 in part where the convex first support part 183 and the annular second support part 182 are not abutted.

A same annular fragile portion as the annular fragile portion 6 shown in (b) in FIG. 4 is formed on the annular surface 195.

Part of an operation of an embodiment, in which the gas generator 100D shown in FIG. 13 is incorporated into an airbag system mounted to an automobile, will be described.

Prior to actuation, the closing member 190 is supported by the first support part 183 and the second support part 182 (the first effect).

When the automobile collides and receives the impact, an actuation signal output device causes the igniter 134 to actuate and ignite, and the gas generating agent 136 is burnt to generate a high-temperature combustion gas.

The closing member 190 is annularly ruptured by the combustion gas along the fragile portion 6 formed on the annular surface 195, and the gas discharge path from the gas generating chamber 130 to the pressurized gas chamber 120 is opened.

Subsequently, a similar operation to the gas generator 100B shown in FIG. 7 is performed.

(6) Gas Generator Shown in FIGS. 14 and 15

In a gas generator 200, an ignition device chamber 230, a gas inflow chamber 240, and a pressurized gas chamber 220 are arranged inside a cylindrical housing 210.

The cylindrical housing 210 is formed by an ignition device chamber housing 211 and a pressurized gas chamber housing 212. However, the cylindrical housing 210 may be formed by a single housing as a whole.

In the ignition device chamber housing 211, an electric igniter 225 is fixed to an opening at a first end 211a.

A second end 212a of the pressurized gas chamber housing 212 is closed (a closing surface 213).

A second end 211b of the ignition device chamber housing 211 and a first end 212b of the pressurized gas chamber housing 212 are integrated by welding in a joint portion 214.

The cylindrical housing 210 (the ignition device chamber housing 211 and the pressurized gas chamber housing 212) is formed of iron, stainless steel, or the like.

The inside of the pressurized gas chamber 220 is filled with a gas such as argon or helium under high pressure.

The gas is loaded from a gas filling hole in the closing surface 213 of the pressurized gas chamber housing 212. The gas filling hole may be formed in a circumferential wall surface of the pressurized gas chamber housing 212.

A pin 215 is inserted into the gas filling hole after the gas is filled, and then welded together with the closing surface 213 to close the gas filling hole.

A rupturable plate 247 of the pressurized gas chamber is welded and fixed to a fixing portion (an annular fixing portion) 242 and closes between the pressurized gas chamber 220 and the gas inflow chamber 240.

The fixing portion 242 has an annular plate surface portion 243, which extends inward in a radial direction of the housing from the second end 211b of the ignition device chamber housing 211, and a cylindrical wall portion 244 which extends from an inner circumferential portion of the annular plate surface portion 243 toward the gas inflow chamber 240. The rupturable plate 247 is welded and fixed to the annular plate surface portion 243 from the pressurized gas chamber 220.

The rupturable plate 247 is formed of iron, stainless steel, or the like, and has an annular welded portion 247a, which is welded and fixed to the annular plate surface portion 243, and a circular non-welded portion 247b which is positioned inside the annular welded portion 247a.

The rupturable plate 247 is subjected to pressure from the pressurized gas chamber 220 and deforms so as to protrude toward the gas inflow chamber 240.

The gas inflow chamber 240 is a space into which the gas from the pressurized gas chamber 220 and a combustion gas from the ignition device chamber 230 flow at the time of actuation.

A plurality of the gas discharge ports 229 are formed at locations facing the gas inflow chamber 240 in the ignition device chamber housing 211, and the gas discharge ports 229 are closed from inside by a metallic seal tape 228. The seal tape 228 may be omitted.

The plurality of the gas discharge ports 229 are formed equidistantly in the circumferential direction of the ignition device chamber housing 211. The plurality of the gas discharge ports 229 may be circumferentially arranged in two rows in an X-axis direction or may be circumferentially arranged in a staggered pattern.

A cylindrical filter may be disposed at a position facing the gas discharge ports 229 in the gas inflow chamber 240.

In the gas inflow chamber 240, a step portion 217 is formed between the ignition device chamber 230 and the rupturable plate 247.

The step portion 217 is obtained by an inner diameter, of the ignition device chamber housing 211, reduced in a portion between the ignition device chamber 230 and the rupturable plate 247. A plurality of protrusions protruding inward from an inner circumferential wall surface 211c of the ignition device chamber housing 211 may be formed instead of the step portion 217.

A movable body 250 including a base 251 and a rod 260 extending from the base 251 toward the rupturable plate 247 is disposed between the gas inflow chamber 240 and the ignition device chamber 230.

The base 251 of the movable body 250 is the support member 10D shown in FIG. 5.

The base 251 has a convex first support part 253, which extends in one direction from a center portion of the base 251, and an annular second support part 252 which extends in a same direction as the first support part 253 from a circumference of the base 251. The distal end surface of the first support part 253 is a flat surface.

A plurality of the gas passage holes 255 are formed equidistantly in the circumferential direction in the base 251 in part where the annular second support part 252 and the rod 260 are not formed.

The annular second support part 252 slidably abuts against the inner circumferential wall surface 211c of the ignition device chamber housing 211.

The closing member 60 includes a bottom surface portion 61 and a circumferential wall portion 62 extending toward the igniter 225 from an outer circumference of the bottom surface portion 61.

In the closing member 60, the bottom surface portion 61 on a side where the circumferential wall portion 62 is formed is a first surface 61a, and the back surface thereof is a second surface 61b.

The first surface 61a of the closing member 60 is a surface on the side of the igniter 225 and the second surface 61b of the closing member 60 is a surface on the side of the gas discharge ports 229.

An outer surface of the circumferential wall portion 62 abuts against the inner circumferential wall surface 211c of the ignition device chamber housing 211, and a sealing agent or the like is applied between the outer surface of the circumferential wall portion 62 and the inner circumferential wall surface 211c to keep airtightness.

The closing member 60 is supported by a distal end surface of the first support part 253, which abuts against a center portion of the second surface 61b, and the annular second support part 252 which abuts against an outer circumferential edge portion of the second surface 61b.

The closing member 60 has an annular surface 65 in the bottom surface portion 61 in part where the annular second support part 252 and the convex first support part 253 are not abutted.

The same annular fragile portion 64 as the annular fragile portion 6 shown in (b) in FIG. 4 is formed on the annular surface 65.

In FIGS. 14 and 15, a width (X) of the annular surface 65 and a distance (Z) from the annular surface 65 to the gas passage holes 255 satisfy a relationship expressed as ½X<Z in a similar manner to FIG. 2.

Next, an operation when the gas generator 200 shown in FIG. 14 is incorporated into an airbag system mounted to an automobile will be described.

When the automobile collides and receives the impact, an actuation signal output device causes the igniter 225 to actuate and ignite, and a gas generating agent 226 is burnt to generate a high-temperature combustion gas inside the ignition device chamber 230.

A rise in pressure inside the ignition device chamber 230 due to the high-temperature combustion gas causes the annular surface 65 of the closing member 60 to be ruptured and separated into two cleavage fragments, namely, the annular cleavage fragment 62a and the circular cleavage fragment 61a as shown in (a) and (b) in FIG. 8.

Accordingly, a gas discharge path from the ignition device chamber 230 to the gas inflow chamber 240 and further to the gas discharge ports 229 is opened.

Since the annular cleavage fragment 62a is abutted against the annular second support part 252 and the ignition device chamber housing 211 and a step is formed by the second support part 252, the annular cleavage fragment 62a is undetachable therefrom.

Since the circular cleavage fragment 61a is pressed against the convex first support part 253 by the combustion gas flow entering the gas inflow chamber 240 from the ignition device chamber 230 and advancing toward the gas discharge ports 229, the circular cleavage fragment 61a is undetachable therefrom.

Further, the rod 260 of the movable body 250 moves in an X-axis direction due to the rise in pressure inside the ignition device chamber 230 and causes the rupturable plate 247 to be ruptured, and a gas discharge path from the pressurized gas chamber 1125011220 to the gas inflow chamber 240 and further to the gas discharge ports 229 is opened.

The combustion gas and the pressurized gas discharged from the gas discharge ports 229 inflate an airbag.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A support structure of a closing member for a gas generator, being arranged in the gas generator which includes a cylindrical housing provided with a gas discharge port, the cylindrical housing accommodating therein an ignition device and having an inflating gas source chamber filled with an inflating gas source,
   the support structure comprising:
   a combination of the closing member for closing a gas discharge path and a support member of the closing member to be arranged inside the cylindrical housing,
   the support member including a base and a convex first support part which extends in one direction from a center portion of the base, and further including a gas passage hole in at least one of the base and the convex first support part, a distal end surface of the convex first support part opposing the closing member being a flat surface and in contact with at least a center of the closing member,
   the closing member having a plate shape with a first surface and a second surface,
   the closing member being supported from one surface by a distal end surface of the convex first support part which abuts against a center portion of the first surface or the second surface, and the closing member which has an annular surface not abutted by the convex first support part,
   the closing member being opened as the annular surface of the closing member is ruptured.

2. A support structure of a closing member for a gas generator, being arranged in the gas generator which includes a cylindrical housing provided with a gas discharge port, the cylindrical housing accommodating therein an ignition device and having an inflating gas source chamber filled with an inflating gas source,
   the support structure comprising:
   a combination of the closing member for closing a gas discharge path and a support member of the closing member to be arranged inside the cylindrical housing,
   the support member including a base, a convex first support part which extends in one direction from a center portion of the base, and an annular second support part which extends in a same direction as the first support part from a circumference of the base, and further including a gas passage hole in at least one of the base, the convex first support part and the annular second support part, a distal end surface of the convex first support part opposing the closing member being a flat surface and in contact with at least a center of the closing member,
   the closing member having a plate shape with a first surface and a second surface,
   the closing member being supported from one surface by a distal end surface of the convex first support part which abuts against a center portion of the first surface or the second surface, and the annular second support part of the support member which abuts against an outer circumferential edge portion on the side of the supported surface, and the closing member having an annular surface not abutted by the convex first support part and the annular second support part,
   the closing member being opened as the annular surface of the closing member is ruptured.

3. The support structure of a closing member for a gas generator according to claim 1, wherein the plate-shaped closing member has a bottom surface portion and a circumferential wall portion which extends in one direction from an outer circumference of the bottom surface portion, and the bottom surface portion on a side enclosed by the circumferential wall portion is a first surface and the back surface thereof is a second surface.

4. The support structure of a closing member for a gas generator according to claim 1, wherein the annular surface not abutted by the convex first support part has an annular fragile portion.

5. The support structure of a closing member for a gas generator according to claim 1, wherein the annular surface not abutted by the convex first support part has an annular fragile portion and further has a plurality of fragile portions which are radially formed so as to traverse the annular fragile portion.

6. A gas generator, comprising:
   a cylindrical housing having a first end which is attached with an ignition device and a second end which is on an opposite side from the first end and is attached with a diffuser portion with a gas discharge port;
   a combustion chamber being filled with a gas generating agent and arranged on the side of the ignition device;

a pressurized gas chamber being filled with a pressurized gas as an inflating gas source and arranged on the side of the diffuser portion;

at least one of a gas discharge path between the diffuser portion and the pressurized gas chamber, and a gas discharge path between the combustion chamber and the pressurized gas chamber being closed by the support structure of a closing member according to claim 1 including the combination of the closing member and the support member, during actuation, the closing member being opened as the annular surface of the closing member is ruptured so that a gas is discharged from the gas passage hole.

7. A gas generator, comprising:

a cylindrical housing having a first end which is attached with an ignition device and a second end which is on an opposite side from the first end and is attached with a diffuser portion with a gas discharge port;

a combustion chamber being filled with a gas generating agent and arranged on the side of the ignition device;

a pressurized gas chamber being filled with a pressurized gas as an inflating gas source and arranged on the side of the diffuser portion;

a gas discharge path between the diffuser portion and the pressurized gas chamber being closed by the support structure of a closing member according to claim 2 including the combination of the closing member and the support member, the diffuser portion corresponding to the support member of a support structure of a closing member, the diffuser portion including the base, the annular second support part which extends in one direction from a circumference of the base, and the convex first support part which extends in a same direction as the annular second support part from a center portion of the base, and the diffuser portion further including the gas discharge port in at least one of the annular second support part and the base in part where the annular second support part and the convex first support part are not formed, the closing member being arranged such that a first surface is on the side of the pressurized gas chamber and a second surface is on the side of the diffuser portion, the closing member being supported by the annular second support part of the diffuser portion which abuts against an outer circumferential edge portion on the second surface of the closing member and a distal end surface of the first support part of the diffuser portion which abuts against a center portion on the second surface of the closing member, and the closing member including an annular surface not abutted by the annular second support part and the convex first support part, during actuation, the closing member being annularly opened as the annular surface of the closing member is ruptured so that a gas is discharged from the gas discharge port.

8. A gas generator, comprising:

a cylindrical housing having a first end which is attached with an ignition device and a second end which is on an opposite side from the first end and is attached with a diffuser portion with a gas discharge port;

a combustion chamber being filled with a gas generating agent and arranged on the side of the ignition device;

a pressurized gas chamber being filled with a pressurized gas as an inflating gas source and arranged on the side of the diffuser portion;

a gas discharge path between the combustion chamber and the pressurized gas chamber being closed by the support structure of a closing member according to claim 2 including the combination of the closing member and the support member, the support member of the support structure of the closing member being disposed on the side of the pressurized gas chamber and the closing member being disposed on the side of the combustion chamber, the closing member being disposed such that a first surface is on the side of the combustion chamber and a second surface is on the side of the pressurized gas chamber, the closing member being supported by the annular second support part of the support member, which abuts against an outer circumferential edge portion on the second surface of the closing member, and a distal end surface of the convex first support part which abuts against a center portion on the second surface of the closing member, and the closing member including an annular surface not abutted by the annular second support part and the convex first support part, during actuation, the closing member being annularly opened as the annular surface of the closing member is ruptured the combustion chamber and the pressurized gas chamber are communicated with each other by the gas passage hole.

9. A gas generator, comprising:

a cylindrical housing having a first end which is attached with an ignition device, and a closed second end which is on an axially opposite side from the first end, a combustion chamber being filled therein with a gas generating agent and arranged on the side of the first end of the cylindrical housing;

a pressurized gas chamber being filled therein with a pressurized gas and arranged on the side of the second end of the cylindrical housing; and a gas inflow chamber being provided with a gas discharge port and arranged between the combustion chamber and the pressurized gas chamber;

a first closing member, in which the support structure of a closing member according to claim 2 including the combination of the closing member and the support member is used, closing between the combustion chamber and the gas inflow chamber, and a second closing member closing between the pressurized gas chamber and the gas inflow chamber, a movable body, which is slidable in an axial direction upon actuation, being disposed in the gas inflow chamber, the movable body including a base slidable along an inner circumferential surface of the combustion chamber and a rod protruding from the base toward the second closing member, the base being the support member in the support structure of a closing member, the base including a convex first support part which extends in the direction of the ignition device from a center portion of the base, and an annular second support part which extends in the direction of the ignition device from a circumference of the base, and the base further including a gas passage hole in part where the convex first support part and the annular second support part of the base are not formed, the first closing member having a plate shape including a first surface on the side of the ignition device and a second surface on the side of the gas inflow chamber, the first closing member being supported by a distal end surface of the convex first support part of the base, which abuts against a center portion of the second surface, and the annular second support part of the base, which abuts against an outer circumferential edge portion of the second surface, and the first closing member including an annular surface not abutted by the convex first support part and the annular second support part, during actuation, the first closing member being opened as the annular surface of the first closing member is annularly ruptured, and the combustion chamber and the gas inflow chamber are communicated with each other by the gas passage hole.

10. The support structure of a closing member for a gas generator according to claim 2, wherein the plate-shaped closing member has a bottom surface portion and a circumferential wall portion which extends in one direction from an outer circumference of the bottom surface portion, and the bottom surface portion on a side enclosed by the circumferential wall portion is a first surface and the back surface thereof is a second surface.

11. The support structure of a closing member for a gas generator according to claim 2, wherein the annular surface not abutted by the convex first support part and the annular second support part of the closing member has an annular fragile portion.

12. The support structure of a closing member for a gas generator according to claim 2, wherein the annular surface not abutted by the convex first support part and the annular second support part of the closing member has an annular fragile portion and further has a plurality of fragile portions which are radially formed so as to traverse the annular fragile portion.

13. A gas generator, comprising:
a cylindrical housing having a first end which is attached with an ignition device and a second end which is on an opposite side from the first end and is attached with a diffuser portion with a gas discharge port;
a combustion chamber being filled with a gas generating agent and arranged on the side of the ignition device;
a pressurized gas chamber being filled with a pressurized gas as an inflating gas source and arranged on the side of the diffuser portion;
at least one of a gas discharge path between the diffuser portion and the pressurized gas chamber, and a gas discharge path between the combustion chamber and the pressurized gas chamber being closed by the support structure of a closing member according to claim 2 including the combination of the closing member and the support member,
during actuation, the closing member being opened as the annular surface of the closing member is ruptured so that a gas is discharged from the gas passage hole.

* * * * *